Figure 5:
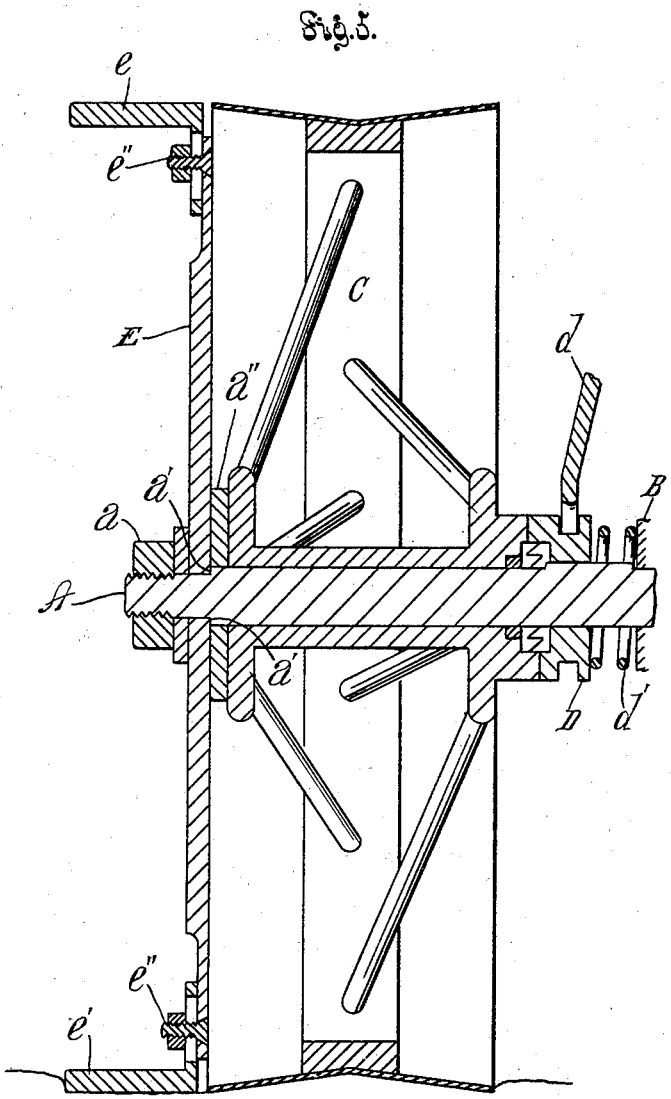

No. 612,903. Patented Oct. 25, 1898.
R. L. HUFFMAN.
CHECK ROW CORN PLANTER.
(Application filed Sept. 28, 1897.)
(No Model.) 3 Sheets—Sheet 1.
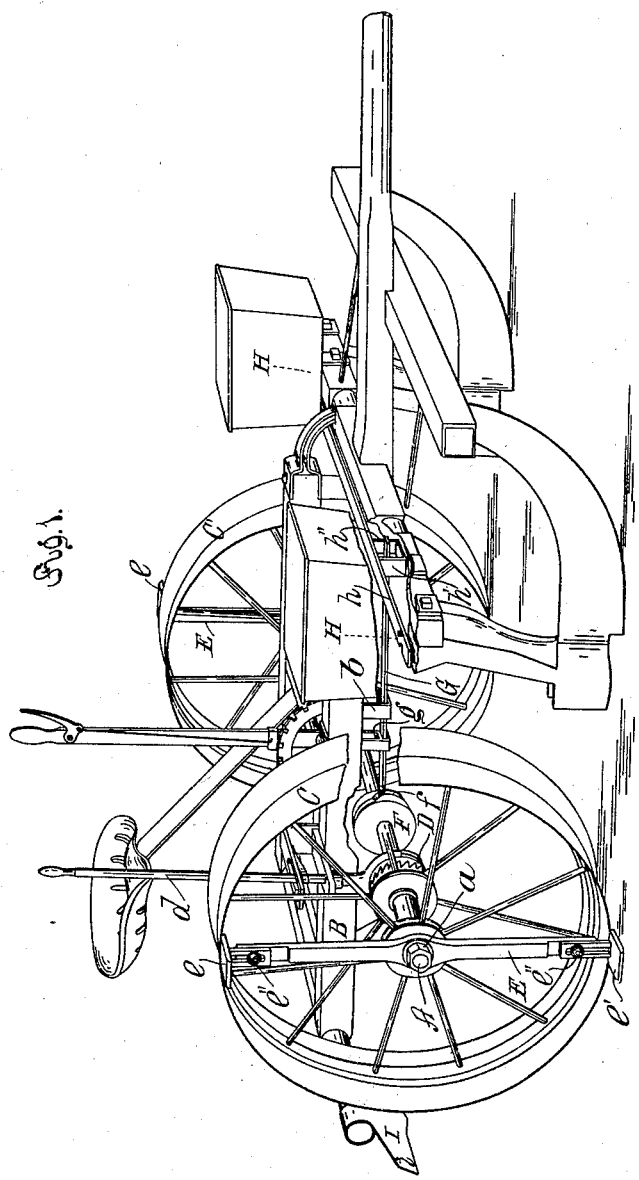

No. 612,903. Patented Oct. 25, 1898.
R. L. HUFFMAN.
CHECK ROW CORN PLANTER.
(Application filed Sept. 28, 1897.)
(No Model.) 3 Sheets—Sheet 2.
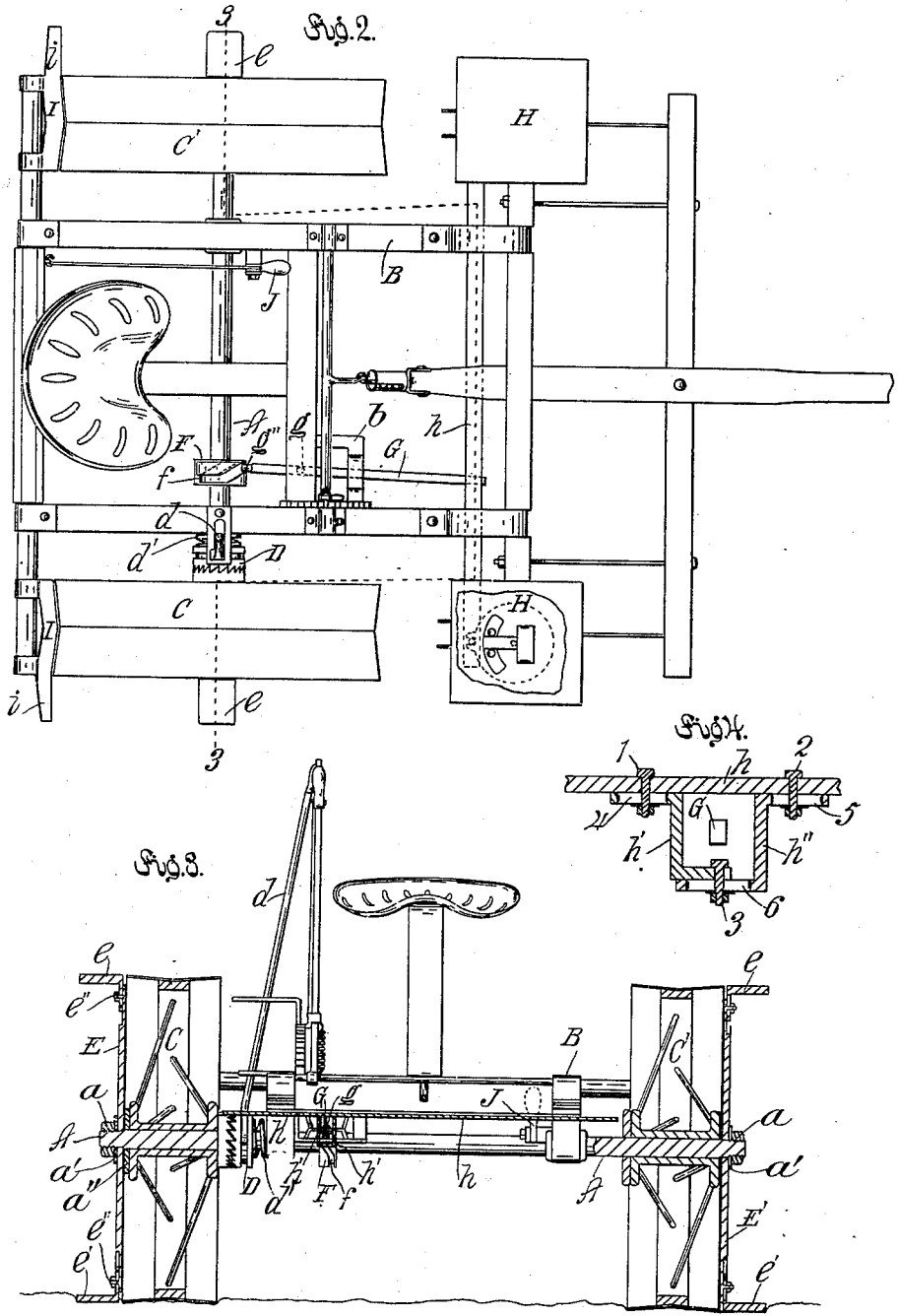

No. 612,903. Patented Oct. 25, 1898.
R. L. HUFFMAN.
CHECK ROW CORN PLANTER.
(Application filed Sept. 28, 1897.)

(No Model.) 3 Sheets—Sheet 3.

UNITED STATES PATENT OFFICE.

ROBERT L. HUFFMAN, OF SANTA ANA, CALIFORNIA, ASSIGNOR OF ONE-HALF TO CHARLES S. HUFF, OF SAME PLACE.

CHECK-ROW CORN-PLANTER.

SPECIFICATION forming part of Letters Patent No. 612,903, dated October 25, 1898.

Application filed September 28, 1897. Serial No. 653,375. (No model.)

*To all whom it may concern:*

Be it known that I, ROBERT L. HUFFMAN, a citizen of the United States, residing at Santa Ana, in the county of Orange and State of California, have invented a new and useful Check-Row Corn-Planter, of which the following is a specification.

This invention relates to improvements in check-row corn-planting machines which will automatically drive the dropper mechanism by power derived from the ground-wheels, provision being made to mark the ground so that the attendant can tell where the corn is being dropped, provision also being made for setting the machine to drop at the required place.

One object of my invention is to provide a very simple and compact machine which will make the imprints in such position with relation to the driver and the track of the wheels as to best enable the driver to readily see that the hills of corn are being made at the proper places. I accomplish this object and increase the simplicity of the machine by rigidly connecting the presser-feet or marker-arms with the axles outside of and free from the ground-wheels. For this purpose the axle is provided near its ends and outside of the journals for the wheels with a shoulder, and the presser-arms are removably fixed to the ends of the axle outside of the ground-wheels, being clamped against the said shoulders by means of a nut, and a washer is interposed between the marker-arm and the hub of the wheel to hold the wheel in place on the axle. The wheels turn freely on the axle without moving the markers, so that the markers do not engage the ground except when the clutches are thrown in to clutch the axle to the driving-wheel.

Another object of my invention is to provide for operating the dropping mechanism with a sudden and a jarring movement, thus to avoid any liability of corn clogging in the dropping mechanism, and the mechanism is so arranged that the dropping occurs at the place that will be indicated by the marker as the machine advances.

My invention comprises the combination of a frame, an axle journaled thereto, ground-wheels journaled on the axle, a clutch to connect and disconnect one of the ground-wheels and the axle, and a cam mounted on the axle and arranged to completely throw its lever at a small portion of its rotary movement and leaving the lever at rest during a greater portion of the rotary movement of the cam. The dropper mechanism, which is carried by the frame, is provided with two stops, and the lever is pivoted to the frame and at one end operatively engaging the cam and the other end playing between the stops and having sufficient movement to operate the dropping mechanism, thereby causing the lever to stand still during a portion of the rotation of the axle, and then during another portion of the rotation of the axle the lever plays free without engaging the dropper-operating stops, and at the final movement of the lever the stop is engaged and the dropping operation takes place in a very short period of time. The lever travels some distance after it is actuated by the cam before it strikes the stop which operates the dropping mechanism, so that when the lever strikes the stop it strikes it with considerable force and moves it suddenly and with a considerable jar.

My invention comprises various parts and combinations hereinafter described and claimed.

The accompanying drawings illustrate my invention.

Figure 1 is a perspective view of my newly-invented check-row corn-planter with parts broken away to expose operative parts. Fig. 2 is a plan of the check-row corn-planter. Fig. 3 is a sectional elevation on the irregular line 3 3, Fig. 2. Fig. 4 is a sectional detail showing adjustable stops for dropper mechanism. Fig. 5 is a sectional view, enlarged, showing the wheel, marker-arm, washer, nut, and the axle reduced and shouldered at its outer end.

A indicates the axle, journaled to the frame B of the corn-planter and provided with ground-wheels C C′, journaled on the axle.

D is a clutch to connect and disconnect one of the ground-wheels C and the axle for driving the axle.

E E' are arms fixed to the axle at opposite sides of the machine to rotate with the axle and provided with presser-feet $e$ $e'$ to make imprints in the ground.

F indicates a cam fixed to the axle to rotate therewith and provided with a cam groove $f$.

G is a lever pivoted to the frame B by a pivot $g$ and with one end operatively connected with the cam F, being in the groove $f$, so that the cam will throw the lever. Suitable dropping mechanism, as at H, is operatively connected with the other end of the lever. In Fig. 2 one half of the groove $f$ is shown. It is to be understood that the other half of the groove is a counterpart of the half shown.

The lever G preferably extends in a right line forward radially from the cam F, and the end of the short arm of the lever extends into the cam-groove $f$, so that the motion of the cam is transmitted through the lever to the bar $h$ without any twisting strain upon the pivot $g$.

The cam F is arranged to give the lever G sufficient movement to shift the bar $h$ of the dropping mechanism H to operate such mechanism.

$h'$ $h''$ indicate two stops acted on by the lever, the parts being so arranged and timed that the imprints are made at the points where the seed is dropped. The stops $h'$ $h''$ are set at such a distance apart that during a portion of the movement of the lever G the lever does not engage the stops, but simply moves from one to the other, the parts being preferably so timed that the dropping mechanism will be operated to drop the grains at that point on the ground which will be in a right line drawn between the imprints simultaneously made by the feet on opposite sides of the machine, so that the imprints will indicate to the eye the points at which the seeds are dropped.

I indicates a scraper for scraping any accumulations from the tire of the wheel. An extension $i$ on the scraper serves to remove accumulations from the feet $e$ and $e'$. The scraper is thrown into and out of working position by means of the lever J. Each imprinting-foot is adjustably connected with its arm, so that by moving the feet out from or in toward the axle A the imprints can be made of greater or less depth.

$e''$ indicates bolts for adjustably connecting the feet to the arms.

$d$ indicates the lever for throwing the clutch into and out of action.

$d'$ indicates a spring for holding the clutch in engagement.

By preference the stops $h'$ $h''$ are adjustable by means of bolts and slots 1 2 3 4 5 6, so that the throw of the bar $h$ can properly work the dropper.

The width of the lever G at the end which plays laterally between the stops is considerably narrower than the space between the stops, so that the lever will have a considerable throw in passing from one stop to the other; but the lever has sufficient movement laterally to throw the stops respectively to operate the dropping mechanism after the lever has passed from one stop to the other and engaged such other stop.

$g''$ indicates a roller on the end of lever G to reduce friction.

$b$ indicates a lever-supporting guide fixed to the frame B and in which guide the lever G moves horizontally. The purpose of this guide is to hold the lever from being thrown up and down by the impact of the cam F at the throwing movement.

$a$ indicates the nuts which clamp the arms E E' against the shoulders $a'$ on the axle.

$a''$ indicates the washer between the arm E and the hub of the wheel C.

Before passing over hard ground in going from field to field it is best to adjust the presser-feet along their arms, moving them toward the axle, so that they will be inside the circumference of the wheel and will not strike upon the ground.

In beginning to plant a field the driver will upon entering the field adjust the feet to the position shown in the drawings, so as to make the imprints. He will then throw the clutch into engagement and will drive along the edge of the field, thus planting two rows and setting the pattern for the rest of the field. At the other end of the field he will throw the clutch out of engagement, turning the machine and bringing the axle into line with the first intended row of the pattern set, being in line with the last two hills planted. He will then dismount and turn the arms into vertical position, so that a pair of feet, as at $e'$, will press into the ground at the place where the seed is to be dropped, thus making two imprints in line with the last two hills planted. He will then mount the machine, throw the clutch into engagement, and drive across the field parallel with the track of the machine previously made, thus planting two more rows of hills. The parts are so arranged and timed that when the arms are vertical and the feet are in their imprinting position the cam will be in such a position that when the clutch is in engagement and the machine moved forward the dropping mechanism will be actuated by the lever G to drop the grain at those points which will be in line between the imprints which will be formed by the feet $e$ at the half-revolution of the wheel, and at each revolution of the wheel the dropping mechanism will be actuated twice and grain dropped in four places adjacent, respectively, to the four imprints which will be made by the four feet at each revolution. By inspecting the imprints the driver can note whether or not the grain is being dropped in right rows. Since the marker-feet of my machine are placed on the outside of the ground-wheels, the imprints along the row which has just been planted are brought closer to the driver than with former machines, and he can more easily determine when the machine is in position for starting the new row and can more readily note when the machine is not planting in line with the rows already planted. In case he finds that the machine is not making the imprints in line with the rows of the pattern he will stop the machine when the axle is in line with a row of the pattern formed, throw the clutch out of engagement, and will then dismount and turn the arms to vertical position, so as to make the imprints in line with that row of the pattern in line with which the machine is standing. Then the clutch will be thrown into engagement and the work proceeded with. This is continued until the field is planted.

It is to be understood that the dimensions herein mentioned are not essential. Other dimensions may be used, if desired.

In a regular field-size machine the span between the droppers will preferably be four feet and the circumference of the wheels will be seven feet eight inches, and there will be two presser-feet for each wheel, so that the hills along the path of the wheels will be three feet ten inches apart, while the hills across the machine will be four feet apart; but I do not limit myself by the dimensions stated.

Now, having described my invention, what I claim as new, and desire to secure by Letters Patent, is—

1. A check-row corn-planter having its axle journaled to the frame of the planter and provided with journals for the ground-wheels and being reduced in diameter to leave at its ends, outside of said ground-wheel journals, shoulders; ground-wheels journaled on said axles; marker-arms mounted on the ends of said axle and resting against said shoulders; nuts screwed upon the axle to press the arms against said shoulders; and a clutch for connecting one of said ground-wheels with said axle.

2. A check-row corn-planter having its axle journaled to the frame of the planter and provided with journals for the ground-wheels and being reduced in diameter to leave at its ends outside of said ground-wheel journals, shoulders; ground-wheels journaled on said axles; marker-arms mounted on the ends of said axle and resting against said shoulders; nuts screwed upon the axle to press the arms against said shoulders; a clutch for connecting one of said ground-wheels with said axle; a cam mounted on the axle; the dropper mechanism carried by the frame and provided with two stops; and a lever pivoted to the frame and at one end operatively engaging the cam and at the other end playing laterally between the stops and being considerably narrower than the space between the stops, so as to have a considerable throw in passing from one stop to the other, and having sufficient movement laterally, to throw the stops, respectively, to operate the dropping mechanism.

3. The combination of the frame; the axle journaled thereto; ground-wheels journaled on the axle; a clutch to connect and disconnect one of the ground-wheels and the axle; a cam mounted on the axle; the dropper mechanism carried by the frame and provided with two stops; a lever pivoted to the frame and at one end operatively engaging the cam and at the other end playing laterally between the stops and being considerably narrower than the space between the stops, so as to have a considerable throw in passing from one stop to the other, and having sufficient movement laterally, to throw the stops, respectively, to operate the dropper mechanism; and feet connected with the axle to rotate therewith and to make imprints in the ground, the parts being timed with relation to each other substantially as set forth; whereby the imprints are made at the points where the seed is dropped.

4. The combination of the frame; the axle journaled to the frame; ground-wheels on the axle, one being connected therewith to rotate the axle; the dropper mechanism carried by the frame and provided with two stops; a lever pivoted to the frame and playing laterally between the stops and being considerably narrower than the space between the stops, so as to have a considerable throw in passing from one stop to the other, and having sufficient movement laterally, to throw the stops, respectively, to operate the dropping mechanism; and a cam on the axle and arranged to completely throw said lever at a small portion of the rotary movement of said cam and leaving the lever at rest during a considerable portion of the rotary movement of the cam.

5. The combination of the axle having a driving-wheel to drive the same; the dropping mechanism; a lever pivoted to the frame; a cam on the axle to engage one end of the lever to operate the same; and two stops adjustably connected with the dropping mechanism and arranged to be engaged respectively by the other end of the lever at the close of its movements when operated by the cam.

6. The combination of the frame; the axle journaled to the frame; ground-wheels on the axle, one being connected therewith to rotate the axle; the dropper mechanism carried by the frame and provided with two stops; a cam fixed on the axle and provided with a peripheral cam-groove; a lever pivoted to the frame and playing laterally between the stops and being considerably narrower than the space between the stops so as to have a considerable throw in passing from one stop to the other and having sufficient movement laterally to throw the stops, respectively, to operate the dropping mechanism, said lever extending radially from the cam and having its short end inserted in the cam-groove, said cam being arranged to completely throw said lever at a small portion of the rotary movement of said cam and leaving the lever at rest during a considerable portion of the rotary movement of the same.

ROBERT L. HUFFMAN.

Witnesses:
JAMES R. TOWNSEND,
CHARLES S. HUFF.